Nov. 27, 1928.
J. NEWMANN
1,693,154
TRANSMISSION MECHANISM
Filed March 16, 1927    4 Sheets-Sheet 4
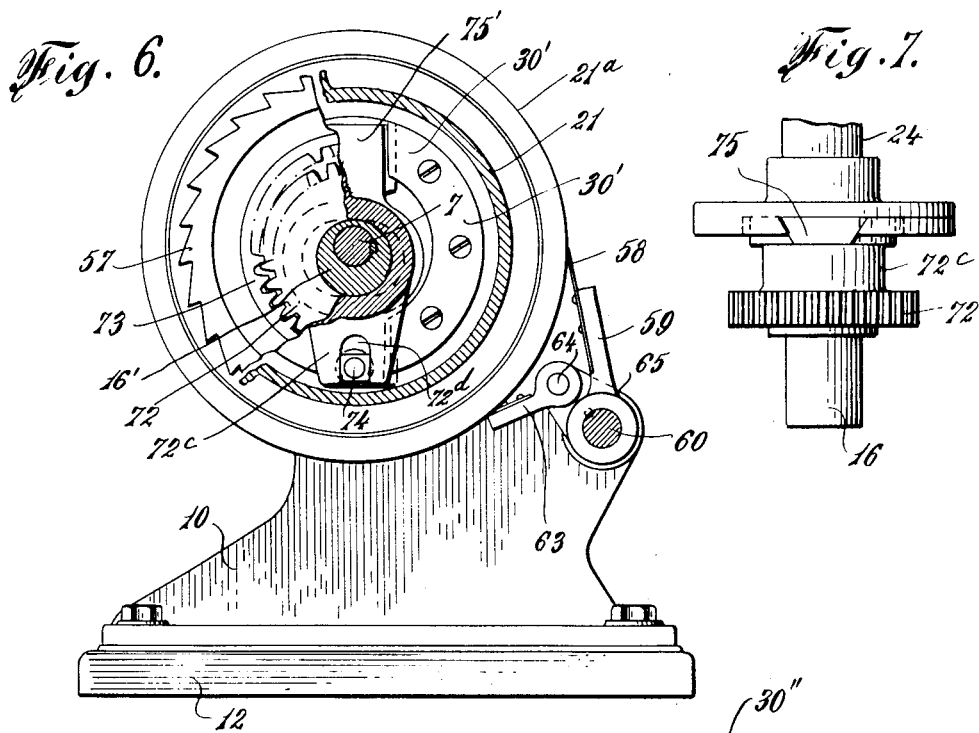
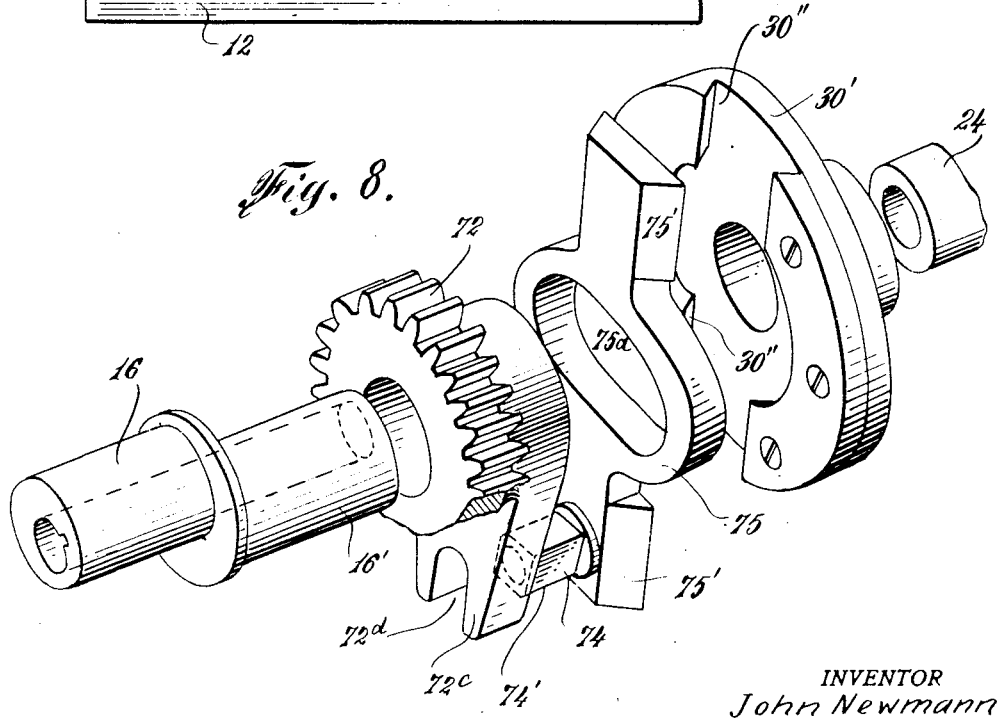
INVENTOR
John Newmann
BY T. F. Bourne
ATTORNEY Patented Nov. 27, 1928.

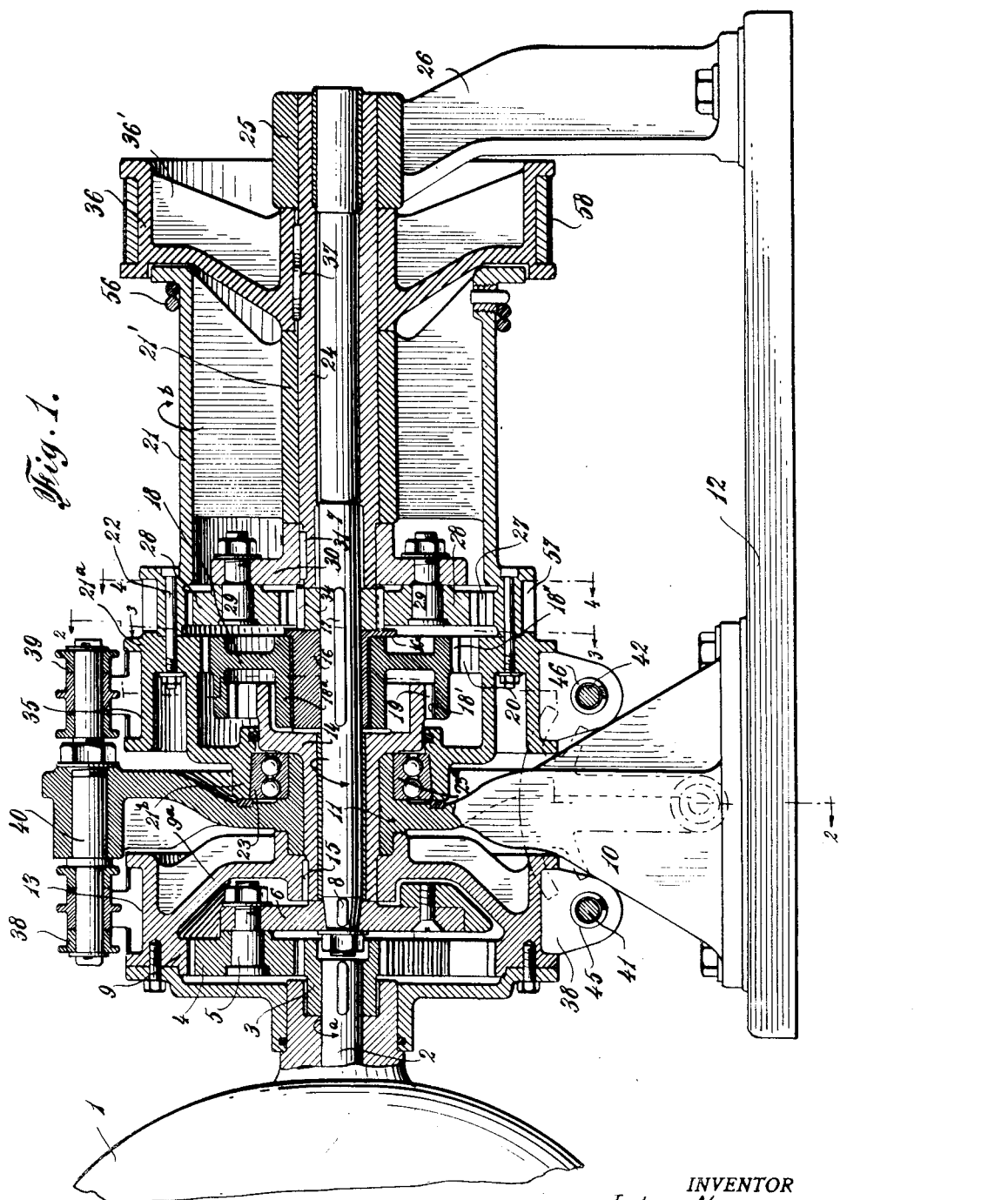

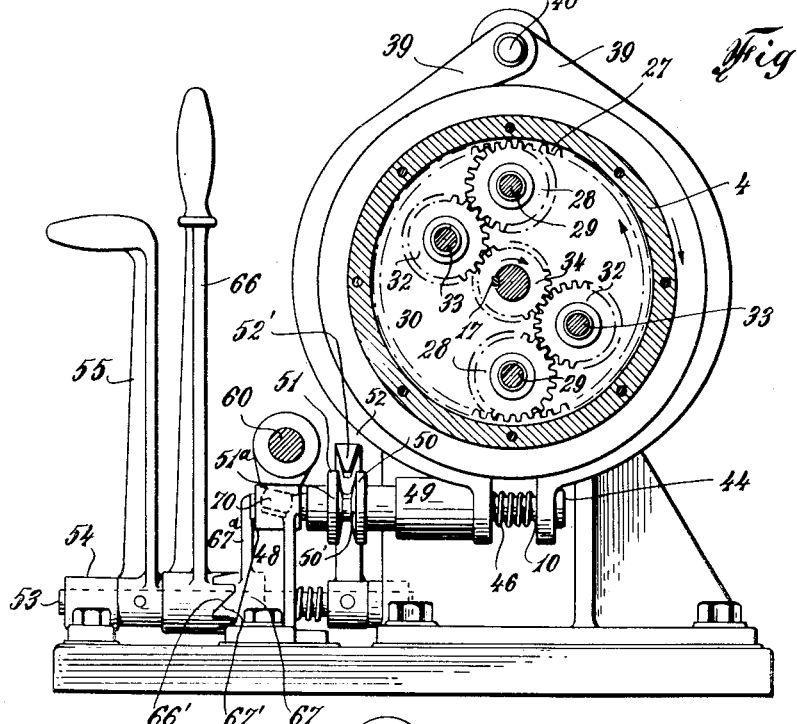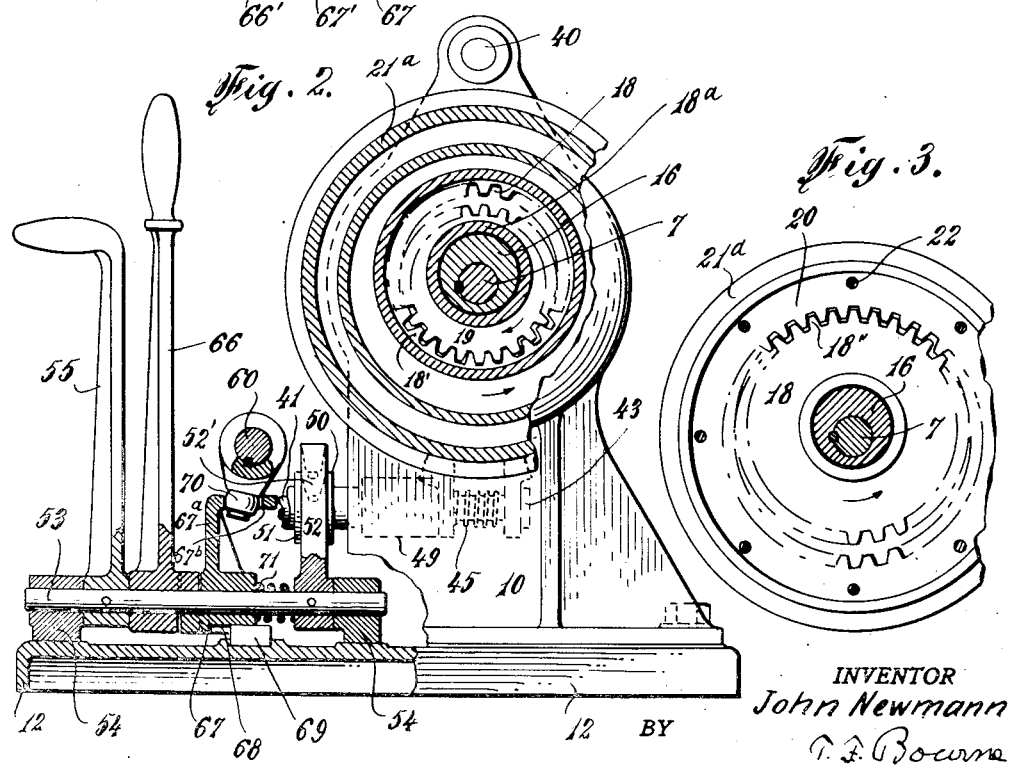

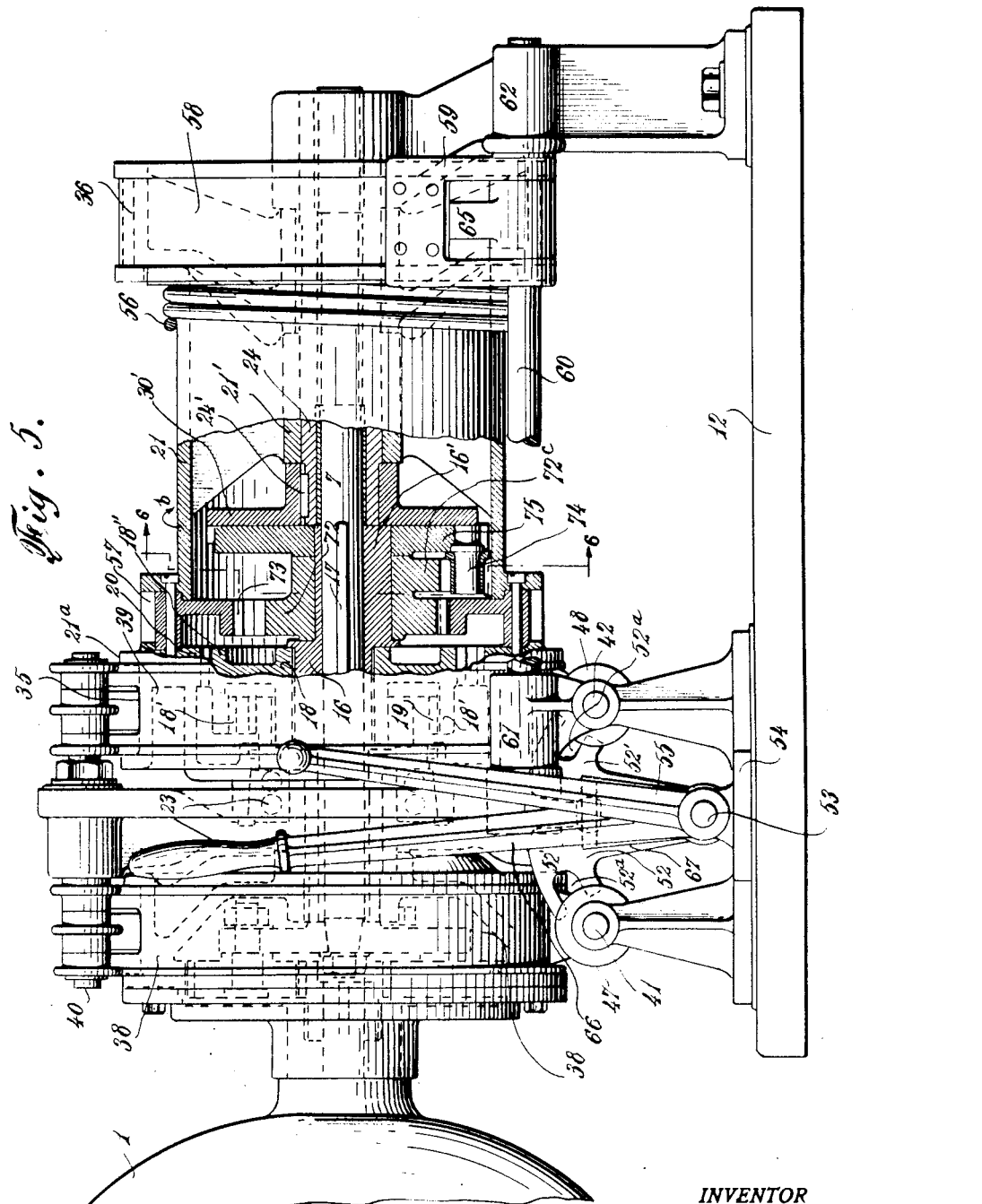

1,693,154

UNITED STATES PATENT OFFICE.

JOHN NEWMANN, OF GLENDALE, NEW YORK.

TRANSMISSION MECHANISM.

Application filed March 16, 1927. Serial No. 175,693

The object of my invention is to provide a transmission mechanism in which a driven member may be rotated from a driving member or prime mover in opposite directions as desired at speeds reduced from the speed of the driving member, and also to manually control the operation of the driven member from a load when the driving member is released from the driven member.

My invention comprises a transmission mechanism including gearing adapted to be driven from any suitable prime mover or source of power, a shaft to be driven by the said gearing at speed reduced from the speed of the prime mover, a driven member or drum, reducing gearing operative by the said shaft for operating the driven member in one direction, other gearing operative by said shaft and cooperative with the driven member for rotating the latter at a different speed from the reducing gearing, and means to control operation of either set of gearing according to the desired direction of rotation of the driven member.

My invention also comprises novel details of improvement that will be more fully hereinafter set forth and then pointed out in the claims.

Reference is to be had to the accompanying drawings forming a part hereof, wherein Fig. 1 is a central sectional view of my improved transmission mechanism;

Fig. 2 is a cross section on line 2, 2, in Fig. 1;

Fig. 3 is a detail section on line 3, 3, in Fig. 1;

Fig. 4 is a cross section on line 4, 4, in Fig. 1;

Fig. 5 is a side view, partly broken away, illustrating a modification;

Fig. 6 is a detail view partly in section substantially on the plane of line 6, 6, in Fig. 5;

Fig. 7 is a detail edge view of the parts shown in Fig. 6, and

Fig. 8 is a detached view of parts of Fig. 5.

Similar numerals of reference indicate corresponding parts in the several views.

A power transmitting apparatus or prime mover, which may be any suitable motor, is indicated at 1, and a driven member or shaft operated by the motor is indicated at 2, to which shaft a gear 3 is secured. The gear 3 is to drive gearing at reduced speed for operation of a driven member. I have illustrated a planetary transmission including one or more pinions 4 in mesh with said gear 3 and journaled upon pivots or gudgeons 5 carried by a spider 6 that is secured to a driven shaft 7, as by a key at 8, which shaft is concentric with shaft 2. At 9 is indicated an internal gear of the planetary transmission in mesh with the pinions 4. A support or frame 10 is provided with a bearing 11 within which the shaft 7 is journaled. At 12 is a base for support 10. The internal gear 9 is shown provided with an annular drum or braking surface at 13 and said internal gear is secured to a tubular shaft 14 by means of web $9^a$ and a key at 15, the shaft 7 being journaled for rotation within the bore of shaft 14, the shaft 14 being shown journaled within the bearing 11. The shaft 7 is provided with an eccentric 16 which may be secured thereto by key 17, upon which eccentric is journaled the hub $18^a$ of a double-toothed gear 18, (Figs. 1 and 2). The eccentric 16 is shown provided with a flange $16^a$ to limit endwise movement of gear 18. The gear 18 has internal annular gear teeth 18' in mesh with an external annular gear 19 concentric with shaft 7 and shown carried by tubular shaft 14, (Fig. 2). By reason of the mounting of gear 18 upon eccentric 16 the gear teeth 18' will be eccentrically in mesh with the gear 19 so that during rotation of eccentric 16 by shaft 7 the gear 18 will be caused to rotate at speed reduced from the speed of shaft 7 by engagement with the gear 19 when the latter is held from rotation. The gear 18 is provided with external gear teeth 18", (Fig. 3), in mesh eccentrically (by reason of eccentric 16), with internal gear 20 connected with a driven member 21, such as a drum, that is mounted concentrically with respect to shaft 7. The meshing of gear teeth 18' and 19 is diametrically opposite the meshing of gear teeth 18" and 20, (Fig. 1). For convenience in manufacture the driven member or drum 21 is provided with a braking member $21^a$ detachably secured thereto by bolts 22, and provided with a hub portion $21^b$ journaled concentrically with respect to shaft 7 as by bearings at 23 carried by bearing 11, (Fig. 1). The drum 21 is also shown provided with an internal hub 21' journaled upon a tubular shaft 24 within which the shaft 7 is journaled, the outer end of shaft 24 being journaled in a bearing at 25 on a support 26 on base 12. The driven member or drum 21 is thus supported by the bearings at 11 and 25. A bearing ring $23^a$ carried by support 10 opposes hub 21' of member $21^a$, (Fig. 1). The gearing 18, 19 and 20 causes the driven member or drum 21 to have a continuous rotary motion.

When the internal gear 9 is retained from rotation the gearing described will cause the driven member or drum 21 to rotate in one direction at speed reduced from the rotation of the driving member or shaft 2. To cause the driven member or drum to rotate in a reverse direction I provide the same with a gear shown in the form of an internal gear 27 in mesh with pinions 28 journaled upon studs or gudgeons 29 carried by a spider 30 that is secured to the shaft 24, as by key 31, idle pulleys 32 being in mesh with the pinions 30, (Figs. 1 and 4), which pinions 32 are rotative upon pivots or gudgeons 33 carried by the spider 30, said pinions being in mesh with a drive gear 34 secured upon shaft 7. The driven member or drum 21 is provided with a braking surface 35, whereby the said member may be retarded or stopped, and the spider 30 is provided with a braking surface 36 shown formed upon wheel 36' secured by key 37 to the shaft 24, whereby said spider and its pinions 28 and 32 may be retarded or stopped from bodily rotation.

Any suitable brake means may be provided for at will controlling the rotation of the internal gear 9, the driven member 21 with its gear 20, and the spider 30 with its pinions. I have shown brake band 38 encircling braking surface 13 of gear 9 and a similar brake band 39 encircling the braking surface 35 of driven member 21, each of said brake bands being shown comprising two members pivotally supported upon pin 40 carried by support 10, the opposite ends of the pin projecting on opposite sides of said support, (Fig. 1). The free ends of each brake band are to be drawn together for gripping the corresponding surfaces 13 and 35 and are to spread to release the same. Means to operate either brake band at will are similarly arranged at each band as follows:—The ends of the brake bands are provided with holes slidably receiving corresponding rods 41 and 42 having heads at their ends, such as 43 and 44, (Figs. 2 and 4), springs 45 and 46 between the ends of the corresponding brake band members serving normally to spread them to release the adjacent annular surface. The rods 41 and 42 are slidably supported in brackets 47, 48 supported by base 12 and upon each rod is a corresponding slidable sleeve 49, one end of which bears against the free end of the corresponding brake member and the opposite end is provided with a head 50, the outer surface of which is shown convex at 50', (Fig. 4). Spaced from the head 50 is a stop 51 that is secured upon the corresponding rods 41 and 42 and is provided with a convex end surface 51ª spaced from the surface 50' on sleeve 49. A controlling member 52, (Fig. 5), is pivotally supported between the spaced rods 41 and 42 to be rocked, which member is secured upon a shaft 53 journaled in brackets 54 secured to base 12. The shaft 53 is provided with operating means shown in the form of a lever or arm 55 secured thereto, which may be manually operated. The member 52 is provided with wedge-like portions at 52' on opposite sides, (Fig. 4), adapted to pass respectively between the head 50 and stop 51 of either brake band when the member is tilted by the lever 55 in one direction or another to control the brake band 38 or 39 as desired. The member 52 is shown provided with recesses 52ª on opposite sides to accommodate the corresponding rods 41 and 42 when said lever or member is rocked to one side or another. When the member 55 is rocked to the left in Fig. 5 the brake band members 38 will be caused to grip the annular surface 13 to retard or stop the internal gear 9, for rotating member 21 in one direction, as for winding rope 56 thereon, and when the member or lever 55 is moved to the right to operate the brake band 39 the surface 13 will be released and the brake band 39 will be operated to retain or retard the driven member 21. The member or drum 21 is shown provided with back stop ratchet teeth 57, (Figs. 1 and 6), adapted to be engaged by a back stop dog in any desired or well known way, which may be manually manipulated to engage the teeth 57 when it is desired to stop the rotation of member 21, so as to retain a weight on the rope in elevated position.

A brake band 58 encircles the braking surface 36, one end of which band is connected with a link 59 loose on shaft 60 journaled in bearings 61, 62, (Fig. 5), and the opposite end of said brake band is shown connected pivotally by link 63 with pin 64 on crank arm 65 secured on shaft 60, whereby when said shaft is rotated to the right in Fig. 6 the arm 65 will cause band 58 to be drawn against braking surface 36 to retard or stop the latter and the spider 30 with its pinions. In order to operate the shaft 60 from a lever or arm 66 in proximity to lever 55, for convenience of operation, I pivot the lever 66 upon shaft 53 and cause said lever at one side to bear against lever 55, (Fig. 2), and on the opposite side of lever 66 at its hub I provide inclined teeth 66' cooperative with corresponding teeth 67' upon a hub 67 slidable upon shaft 53, (Fig. 4), the hub being shown having a groove 68 engaging a key 69 on base 12 to permit the hub to slide without rotation, (Fig. 2). The hub 67 has an arm 67ª provided with a hole 67ᵇ receiving a projection 70 extending from shaft 60. A spring 71 is interposed between hub 67 and member 52, (Fig. 2), normally tending to move the hub and its arm 67ª toward lever 66 with shaft 60 in such position that band 58 will release braking surface 36. When lever 66 is moved to the right in Fig.

5 the hub 67 will be slid along shaft 53 to cause tilting of projection 70 to correspondingly rotate shaft 60 in such a way that its crank arm 65 will cause band 58 to grip braking surface 36 to retard or stop shaft 24, whereby to retain the pinions 28 and 32 from bodily rotation.

When it is desired to rotate the driven member or drum 21 for winding up the rope with the driving member or shaft 2 rotating in the direction of the arrow $a$ in Fig. 1, the lever 55 will be moved to the left in Fig. 5 to cause tightening of brake band 38 upon braking surface 13, whereby the internal gear 9, spider 9$^a$ and gear 19 will be held from rotation. The rotation of shaft 2 will drive pinion 3 which will cause axial rotation of the pinions 4 which, traveling within the internal gear 9, will cause rotation of spider 6, thereby rotating shaft 7, the eccentric 16 and the pinion 34. The rotation of eccentric 16 within gear 18 will cause the latter to rotate in an orbital or eccentric path with its teeth 18' successively engaging the teeth of gear 19, and such orbital rotation of gear 18 with its teeth 18'' successively engaging the teeth 20 of the driven member or drum 21 will cause rotation of the latter in a direction reverse to the direction of rotation of driving member 2, as in the direction of the arrow $b$ in Fig. 1, and at a speed reduced from the speed of rotation of the driving member for winding up the rope 56. When the driving operation of member 21 is to be retarded or stopped the brake band 38 is released from braking surface 31 and the brake band 39 is applied to surface 35 and the gearing will run idly. By means of brake band 35 the member 21 may be allowed to reverse idly under a weight upon the rope so that the weight may be lowered and checked as desired. The ratio of the planetary gearing 3, 4, 9 etc. for rotating shaft 7 from shaft 2 is 7½ to 1, and the ratio of the gearing 18, 19 and 20 for rotating member 21 is 10 to 1, so that member 21 will be driven in the direction of arrow $b$ in reduced ratio of 17½ to 1 from shaft 2. When it is desired to reverse the driving direction of the driven member or drum 21 the band 58 will be caused to grip the braking surface 36, whereby the spider 30 will be retarded or held from rotation, and the rotation of the gear 34 by shaft 7 will be caused by the rotation of gears 3 and 4 and the spider 6 from shaft 2. The rotation of gear 34 will cause axial rotation of the pinions 32 and 28, whereby the internal gear 27 will be rotated in the direction reverse to the arrow $b$, thereby causing corresponding reverse rotation of the driven member or drum 21 for lowering the weight under power as desired at reduced speed from the speed of rotation of shaft 2. The band 58 may be manipulated for retarding, stopping and starting member 21 as desired to control the weight. By shifting the levers 55 and 66 relatively to one another control of the forward or reverse rotation of driven member 21 may be caused as desired for controlling the weight upon the drum. The ratio of the gearing 27, 28, 32 and 34 illustrated is 4½ to 1, so the reverse driving rotation of member 21 through the two planetary gearing sets will be 12 to 1, the eccentric gearing 18, 19 and 20 operating idly.

If it be desired to wind the rope 56 upon driven member or drum 21 at speed greater than previously described the rope 56 will be wound upon the drum in a direction reverse from that intended when the drum is operating in manner first described, and the direction of driving member or shaft 2 will be reversed from the direction of arrow $a$. By now applying the band 58 to the braking surface 36 the member or drum 21 will be correspondingly rotated in the direction reverse to arrow $b$ to wind up the rope, and for lowering the rope said brake band will be released and the brake band 39 will be utilized upon braking surface 35 for retarding the descent of the weight. The driving ratio of member 21 will be 12 to 1. After a weight has been raised by rope 56 the weight may be allowed to descend by gravity by releasing all of the braking means.

In the modification shown in Figs. 5 to 8 the gearing for driving the member or drum 21 in opposite directions is arranged as follows: To the eccentric 16 is attached a diametrically disposed eccentric 16', the shaft 7 passing through both eccentrics, and upon the eccentric 16' is loosely mounted an external gear 72 eccentrically meshing with an internal gear 73 secured to driven member 21, so that when brake band 38 is applied to braking surface 13 and the planetary gearing 9 etc. causes rotation of the shaft 7 the rotation of eccentric 16 will cause orbital rotation of gear 18 in mesh with gears 19 and 20, causing rotation of member 21 in the direction of arrow $b$ in Fig. 5, as before explained. The external gear 72 upon eccentric 16' will rotate in an orbital path in mesh with gear 73, and the gear 72 is provided with a laterally disposed projection 72$^c$ provided with a slot or recess 72$^d$, (Figs. 6 and 8), in which is operative a projection 74 shown in the form of a pin having a rectangularly disposed sleeve 74' operative in slot or recess 72$^d$, the pin projecting from a yoke-like member 75 loosely mounted upon shaft 7 and shown provided with an elongated opening 75$^a$ through which said shaft passes. The member 75 is mounted upon the eccentric 16' with an extended portion of the eccentric within the transverse opening 75$^a$ of said member, (Fig. 5). Secured to shaft 24 by key 24' is a member or disk 30', (corresponding in function to the spider 30), to which member 30' the member 75 is slidably attached for diametrical operation, for which purpose I have shown the member 75 provided with dovetail portions 75' at opposite ends slidably received in correspondingly dovetailed recesses 30" provided in member 30', (Fig. 8). When brake band 58 is applied to braking surface 36 and the shaft 24 and parts 30', 75 and 72° are retained from rotation, the rotation of eccentric 16' will cause orbital rotation of the gear 72 in mesh with gear 73 for rotating said gear 73 to cause rotation of driven member or drum 21 in a direction reverse to arrow b. Said member or drum 21 will be driven reversely at speed reduced from the speed of driving member 2, the gearing 18, 19 and 20 rotating idly. According to the ratio of gearing shown the gears 18, 19 and 20, when used, and the gearing 72, 73, 75 and 30' will rotate the member 21 at similar speeds but in reverse directions respectively. Desired control of the operation of the levers 55 and 66 may be effected in manner before described.

While I have referred to my improvements as adapted for operating a rope 56, such as in a hoisting apparatus, it will be understood that the driven member 21 may be utilized for operating any desired mechanism which may be connected with said member in any approved way for transmitting forward and reverse drive thereto.

The details of construction set forth and the ratio of the various sets or trains of gearing may be varied, within the scope of the appended claims, without departing from the spirit of my invention.

Having now described my invention what I claim is:—

1. An apparatus of the character set forth comprising a driving member, a driven shaft, gearing for rotating said shaft at speed reduced from the speed of the driving member, a gear concentric with said shaft, brake means to control the rotation of said gear and the first named gearing, a driven member, reducing gearing operative by said shaft and cooperative with the concentric gear and with the driven member for rotating the latter at speed reduced from the speed of the driving member when the rotation of the concentric gear is retarded, and reversing gearing cooperative between said shaft and the driven member for rotating the latter by said shaft in a direction reverse to its rotation by the other gearing.

2. An apparatus of the character set forth comprising a planetary transmission mechanism having a driven shaft and an internal gear, a second gear connected with the internal gear, brake means for said gear for retarding them together and causing reduced rotation of said shaft by said planetary transmission, an eccentric operative by said shaft, a driven member, gearing operative by said eccentric and cooperative with the driven member for rotating said driven member in one direction when said internal gear and said second gear are retarded, gearing operative by said shaft and connected with the driven member for rotating the latter in a reverse direction, and means independent of said brake means to control the operation of the last named gearing for reverse rotation of said member.

3. An apparatus of the character set forth comprising a planetary transmission mechanism having a driven shaft and an internal gear, a second gear connected with the internal gear, brake means for said gears for retarding them together and causing reduced rotation of said shaft by said planetary transmission, an eccentric operative by said shaft, a driven member, gearing operative by said eccentric and cooperative with the driven member for rotating said driven member in one direction when said internal gear and said second gear are retarded, planetary gearing operative by said shaft and having an internal gear connected with the driven member, a drive gear connected with said shaft, a spider and gearing carried by said spider in mesh with said internal gear and said drive gear, and brake means independent of the first named brake means for controlling rotation of part of the planetary gearing for causing reverse rotation of the driven member.

4. An apparatus of the character set forth comprising a planetary transmission mechanism having a driven shaft and an internal gear, a second gear connected with the internal gear, brake means for said gears for retarding them together and causing reduced rotation of said shaft by said planetary transmission, an eccentric operative by said shaft, a driven member, gearing operative by said eccentric and cooperative with the driven member for rotating said driven member in one direction when said internal gear and said second gear are retarded, planetary gearing comprising a gear connected with said shaft, an internal gear connected with the driven member, intermediate gearing between said first gear and the internal gear for rotating the driven member, and means independent of said brake means, to control bodily rotation of the intermediate gearing for causing reverse rotation of the driven member.

5. An apparatus of the character set forth comprising a planetary transmission mechanism having a driving member, a driven shaft and an internal gear to control the rotation of said shaft at speed reduced from said member, a second gear connected with the internal gear, brake means for said gears to retard them together, an eccentric operative by said shaft, a driven member, an internal gear connected with the driven member, and an actuating gear upon the eccentric having internal teeth in mesh with the second named gear and having external teeth in mesh with the last named internal gear for rotating said driven member at speed reduced from the speed of said shaft.

6. An apparatus as set forth in claim 5, provided with gearing cooperative between the driven shaft and the driven member for rotating the latter in a direction reverse to that imparted by the eccentric, and means to control operation of the last named gearing for causing reverse rotation of the driven member.

7. An apparatus as set forth in claim 5, provided with planetary gearing for rotating the driven member including a gear upon the driven shaft, an internal gear connected with the driven member, a spider carrying pinions in mesh with the last named gear and the internal gear, and brake means for controlling the rotation of the spider for causing reverse rotation of the driven member.

8. An apparatus of the character set forth comprising a driving member, a planetary transmission having a gear operated by the driving member, a pinion in mesh with the first named gear, an internal gear in mesh with the pinion, a rotative member carrying the pinion, a shaft carrying and operative by said rotative member, an external gear connected with said internal gear, brake means for said internal and external gears to retard them together and to cause rotation of said shaft, an eccentric upon the shaft, an actuating gear upon the eccentric having internal teeth in mesh with said external gear and having external teeth diametrically disposed respecting said internal teeth, a driven member having an internal gear in mesh with said external teeth for rotating said member in one direction when said first named internal and external gears are retarded, gearing cooperative between the driven shaft and the driven member for rotating the latter in a direction reverse to that imparted by the eccentric, and means to control operation of the last named gearing for causing reverse rotation of the driven member.

JOHN NEWMANN.